Figure 1:
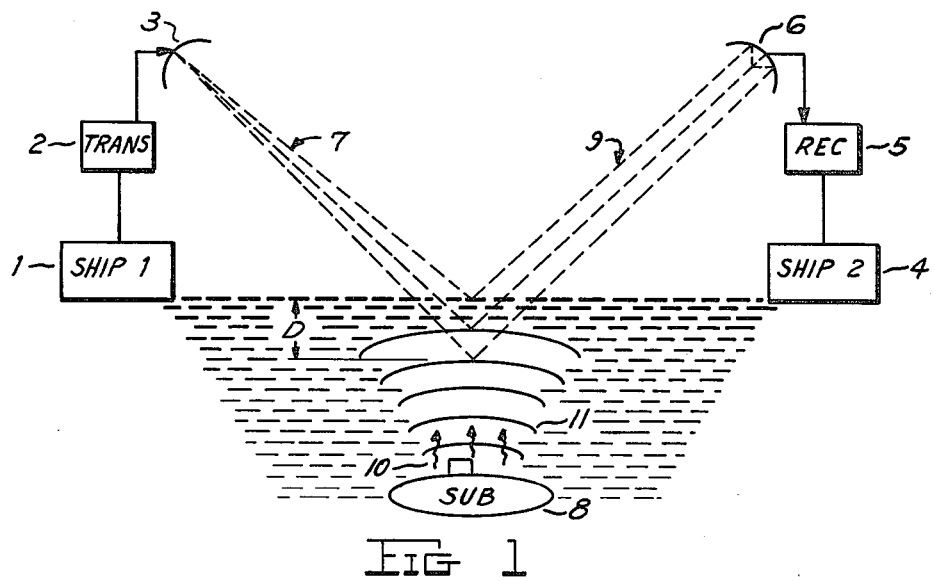

United States Patent
Shostak

[11] 3,903,520
[45] Sept. 2, 1975

[54] UNDERWATER OBJECT LOCATING SYSTEM

[75] Inventor: Arnold A. Shostak, Arlington, Va.

[73] Assignee: The United States of America as represented by the Secretary of the Navy, Washington, D.C.

[22] Filed: Aug. 11, 1960

[21] Appl. No.: 49,106

[52] U.S. Cl............. 343/5 PD; 343/5 R; 343/18 B; 343/8
[51] Int. Cl.² ................... G01S 9/37; G01S 9/46
[58] Field of Search............ 343/5, 18, 6, 18 B, 5 R, 343/5 PD:6 R, 18 R, 6 R, 8

[56] References Cited
UNITED STATES PATENTS
3,153,236  10/1964  Rines .............................. 340/6 R X

*Primary Examiner*—Maynard R. Wilbur
*Assistant Examiner*—G. E. Montone
*Attorney, Agent, or Firm*—R. S. Sciascia; L. I. Shrago

EXEMPLARY CLAIM

1. In a method for determining the presence in the ocean of a submerged object which has a temperature that is different from that of the contiguous seawater, the steps of
radiating a directional beam of electromagnetic waves of a preselected frequency towards the ocean surface at an angle such that a portion of said electromagnetic waves is reflected from the ocean surface and a portion enters the ocean,
said preselected frequency being chosen such that said portion of electromagnetic waves which enter the ocean is propagated an appreciable distance therein,
the electromagnetic waves which are so propagated when they encounter variations in the index of refraction of the seawater caused by the temperature difference between this water and the submerged object being reflected at these subsurface locations with their frequency altered as a consequence of this interaction and, thereafter, emerge from said ocean;
detecting the electromagnetic waves which are reflected from the ocean surface and any electromagnetic waves which emerge from said ocean; and
analyzing the frequency of the electromagnetic waves so detected to determine the presence of any electromagnetic waves which have a frequency different from that of said preselected frequency.

2 Claims, 2 Drawing Figures

PATENTED SEP 2 1975  3,903,520

INVENTOR.
ARNOLD A. SHOSTAK
BY Louis b. Shrago.

UNDERWATER OBJECT LOCATING SYSTEM

The invention described herein may be manufactured and used by or for the Government of the United States of America for governmental purposes without the payment of any royalties thereon or therefor.

The present invention relates generally to object locating systems and more particularly to apparatus for and methods of detecting submerged objects by means of electromagnetic energy radiating and detecting apparatus.

The various methods for locating submarines and other submerged objects can for the most part be subdivided into active and passive systems. In the passive system the detecting apparatus senses a disturbance in the environment caused by the presence therein of the submerged object. Perhaps the best example of this type of a system is the simple underwater listening apparatus wherein a single hydrophone or a hydrophone array picks up acoustic energy emanating from such noise sources as the submarine's propulsion motors and auxiliaries, the local motion of the water in the vicinity of the moving submarine and the forming and collapsing of bubbles around its screws. Another system of this general type employs infrared sensing equipment to scan areas of the sea surface to ascertain temperature discontinuities brought about by the difference in temperature of the submarine's hull and the surrounding sea. The airborne magnetometer which recognizes finite disturbances or distortions in the earth's magnetic field is another example of a passive submarine detecting technique.

Active systems resort to independent radiating sources to probe the search area and illuminate the submerged object. The best example of this class of equipment is afforded by the conventional sonar system wherein a highly directional beam of supersonic energy is periodically radiated from a scanning transducer which thereafter operates as a receiver to detect echoes reflected from an object within the propagation path. The useful application of the sound echo ranging system is limited because of the relatively high transmission losses which increase as a function of the frequency of the propagated energy. In practice, this means that a compromise must be made between achieving maximum range of detection and optimum target definition, for the former requires relatively low frequency signals and the latter relatively high frequency signals.

Since sonar apparatus cannot be incorporated into airborne equipment, a multiplicity of such systems must be utilized to maintain surveillance over relatively large expanses of the ocean. These are limited by bathythermographic and surface state vagaries which are particularly pronounced in bad weather.

It is accordingly a primary object of the present invention to provide a method for determining the location of a submerged object which makes use of electromagnetic radiation and detecting apparatus.

Another object of the present invention is to provide an active airborne surveillance system for locating underwater objects and the like.

A still further object of the present invention is to provide an underwater object locating system which utilizes electromagnetic energy to detect changes in the properties of seawater caused by the presence therein of a submerged object.

A still further object of the present invention is to provide an active system for locating submerged objects which detects through electromagnetic energy apparatus changes in the complex index of refraction of the fluid medium above and surrounding said object.

A still further object of the present invention is to provide a submarine locating system which detects frequency phase and amplitude shifts in a carrier wave illuminating an area of the ocean perturbed by a submarine's presence and operation.

A still further object of the present invention is to provide a submarine detection system wherein local disturbances in the ocean occasioned by the presence therein of said submarine are detected by monitoring the amplitude, phase or frequency of an electromagnetic beam reflected from this region of the ocean.

A still further object of the present invention is to provide a submarine locating system which detects amplitude modulation or Doppler shifts in the frequency of an electromagnetic beam irradiating the ocean surface immediately adjacent to the submarine.

Figure 2:
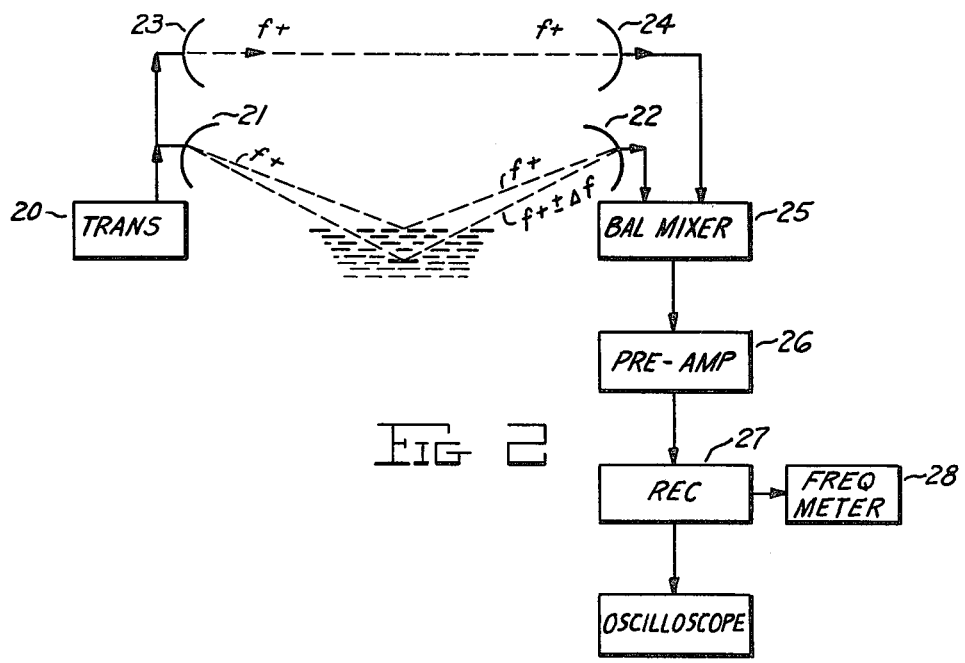

Other objects and many of the attendant advantages of this invention will be readily appreciated as the same becomes better understood by reference to the following detailed description when considered in connection with the accompanying drawings wherein:

FIG. 1 schematically illustrates the general procedure for locating the position of an underwater object according to the present invention; and FIG. 2 illustrates an alternative method wherein the presence of the underwater object is ascertained by sensing the presence of a Doppler shift signal at the receiving station.

Briefly, and in general terms, the above objects of invention are accomplished by making use of the recognized phenomenon that a beam of electromagnetic energy directed toward a fluid medium will penetrate this medium to a depth in meters which, in the case of sea water, is equal to approximately $290 \sqrt{f}$, where $f$ is the frequency of the impinging electromagnetic energy. The fact that the propagation of electromagnetic energy can be sustained to a certain extent within a fluid medium permits low frequency radio communication with submerged submarines and, in a preferred embodiment of the present invention, this phenomenon is employed to detect changes in the physical properties of the sea. The presence of a submarine in a given area will, among other things, bring about changes in the temperature and/or pressure of the contiguous sea water. These changes come about either by convection from the heated shell of water contacting the exterior of the submarine or from adiabatic compression produced by acoustic waves emanating from noise sources in or about the submarine. Either or both of these changes will affect the conductivity and reactivity of the sea water and therefore its index of refraction. In the case where the disturbance is sonically produced, the variations in the index of refraction will be of a cyclic nature and there will be planes or layers where this index has maxima and minima values. Consequently, electromagnetic energy propagated within such a region will have its phase, frequency and amplitude varied.

It is well known from optics that Bragg reflections occur when the distance between successive reflecting atomic planes is equal to one-half the wave length of the incident light. By analogy, maximum reflection of electromagnetic energy occurs when the distance between the aforementioned layers or planes is one-half the wave length of the incident electromagnetic energy is measured within the fluid medium. Reflection also occurs when this condition is not exactly fulfilled, although reflected energy will have a smaller amplitude.

When a beam of electromagnetic energy is directed at a glancing angle towards a region of the ocean below which a submarine is operating, part of the incident energy will be reflected at the interface, where the electric wave impedance is discontinuous and part will be reflected in the form of a Bragg reflection. Since the noise spectrum of the submarine is relatively broad, the conditions necessary for maximum Bragg reflection will normally be satisfied. Hence, the reflected energy will be both amplitude and frequency modulated. In other words, the reflected energy will contain a side band displaced from the incident signal by an amount equal to the frequency of the acoustic energy being propagated within the reaction area. Although sea clutter will normally be present and cause amplitude modulation of the carrier, the aforementioned effect can be readily recognized since it will be monochromatic or composed of discrete frequencies, whereas the sea clutter contributions will result in randomly dispersed modulations.

Because of the complexities of the problem, a rigorous mathematical analysis of the effect of finite variations in the physical properties of the sea water on the amplitude and frequency of the reflected electromagnetic energy will not be presented. As an approximation, however, a change in sea water temperature of about 0.1°F. will bring about a change in the reflection coefficient of a magnitude of about one part in ten thousand. This reflection coefficient, which is the ratio of the reflected power to the incident power, may be expressed by the following equation:

$$(1) \quad \frac{P_R}{P_I} = 1 - \frac{4\alpha_1\alpha_2}{(\alpha_1+\alpha_2)^2+\beta^2}$$

Wherein $\alpha_1^2$, the attenuation propagation constant, equals $$(2) \quad \frac{E}{E_o}\left[\frac{\mu_o E_o \omega^2}{2}(\sqrt{1+n^2}+1)\right]$$

and $\beta_1^2$, the phase constant, equals $$(3) \quad \frac{E}{E_o}\left[\frac{\mu_o E_o \omega^2}{2}(\sqrt{1+n^2}-1)\right]$$

subscripts 1 and 2 connotating air and sea water, respectively. In equation (2) E and $E_o$ are the dielectric constants of sea water and air, respectively, $\omega$ is the angular frequency and n is the index of refraction. The index of refraction is related to the conductivity and dielectric constant by the expression $$(4) \quad n = \frac{\tau}{E\omega}$$

Experimental evidence indicates that for normalized sea water the dielectric constant is $$(5) \quad 81 E_o = \frac{9\times10^{-9}}{4\pi} \quad \frac{\text{farad}}{\text{meter}}$$

and the conductivity is $$(6) \quad \frac{4 \text{ mho} - \text{meter}}{\text{meter}^2}$$

These relations show variations of reflection coefficient with conductivity; it must also be noted that there are variations of reflection coefficient with reactivity.

Referring now to FIG. 1, which graphically illustrates the general procedure for practicing the present invention with a team of surface vessels, a master transmitting ship (or aircraft) 1 is provided with a radio frequency transmitter 2 coupled to an elevated directional scanning antenna 3, and a slave or receiving ship 4 is equipped with a radio receiver 5 coupled to an elevated detecting antenna 6. Signal transmission from the master can either be CW or pulsed at a fixed frequency. The search technique involves simply directing the emergent beam 7 towards the location below or near which a submarine or submerged object 8 is believed to be located and stationing slave ship 4 to intercept the reflected beam 9.

As mentioned hereinbefore, the physical constants of the ocean region perturbed by the submarine will vary from those of the adjacent areas because of the temperature and pressure disturbances brought about by convection 10 from the heated shell of water contacting the submarine's hull and from adiabatic compressions produced by sound waves 11 emanating from various noise sources in and around the submarine 8. Attending these changes are variations in the index of refraction and the coefficient of reflection of the sea water.

From what has been said hereinbefore, it will be appreciated that part of the energy of beam 7 will be directly reflected from the surface of the ocean and part will enter the perturbed region where it will come under the influence of the variable index of refraction existing there. Those planes or layers within the fluid medium which have maximum values of this index will act as electromagnetic energy reflectors and, consequently, part of the initial beam will emerge from the sea with both its amplitude and frequency modulated. It would be pointed out that the shift in frequency of the emergent electromagnetic energy is a Doppler shift brought about by the motion within the fluid medium of planes having a constant index of refraction.

Since the condition for maximum energy reflection within the fluid medium is governed by the Bragg relationship, the noise spectrum of a submarine can be analyzed to arrive at the most desirable transmission frequency. It appears that there is sufficient energy in the 2,000-cycle region to permit transmission frequencies of 200 megacycles. Consequently, a search operation should be carried out with radio receiver 5 tuned to this frequency. For obvious reasons, this receiver should possess a bandwidth capable of detecting sidebands displaced from the carrier signal by 2,000 cycles or so.

In FIG. 2, there is illustrated one arrangement of circuit components for determining sidebands or Doppler shifts in the reflected energy brought about by the movement within the fluid medium of planes having the same index of refraction. In this particular case, tranmitter 20, located on the master, continuously radiates a first directional signal $f_t$ from antenna 21 downwardly towards the search area, which signal after surface and internal reflections is detected by antenna 22 located on the slave vessel. The incoming signals detected by this last antenna will contain frequency $f_t$ because of the surface reflection and frequencies $f_t \pm \Delta f$ because of the internal reflections. At the same time, transmitter 20 also supplies a signal to a second antenna 23 which radiates this signal directly to an antenna 24 mounted on the receiving ship. The signals received by antennas 22 and 24 are fed to a balanced mixer 25 whose output contains among other signals beat frequency $\Delta f$. This Doppler signal is supplied in turn to a preamplifier 26, a receiver 27 and a frequency meter 28.

In the event that it is desired to utilize the presence of amplitude variations in the reflected energy to determine the presence of a submerged object, the balanced mixer can be removed from the system along with frequency meter 28, and the monitoring can be accomplished by visually observing the amplitude of the output of the receiver 27 with a conventional oscilloscope 29.

Although the above description has been directed towards a submarine search operation carried on by surface vessels, it will be readily recognized that both moving and stationary aircraft can take part in an integrated air-sea search program. It will likewise be understood that the location of the precise area under surveillance can be established by simple geometric procedures. In other words, if the altitude and the angular orientation of the scanning or receiving antenna is known, the precise location of the impinging beam can be readily ascertained since the electromagnetic energy is propagated on a straight line basis.

It will likewise be appreciated that the search operation can be performed with a transmitter designed and controlled to radiate an electromagnetic signal whose frequency periodically and cyclically varies between two preselected limits. This mode of operation does not complicate the receiving portion of FIG. 2 since a signal of the correct frequency is always available at the receiver because of the direct transmission path between the two stations. This frequency scanning technique can be carried out until the object is first located and then the transmitter can be locked on the particular frequency which corresponds to the best target indicating condition.

Instead of locating the transmitting and receiving sets on opposite sides of the search area, these components could be mounted in, for example, a hovering type of aircraft, such as a helicopter and the search beam radiated in a vertical direction. Separate transmitting and receiving antennas would, of course, be required in the case of CW operation. But with pulsed operation, a single antenna with a conventional duplexer could be employed.

Obviously many modifications and variations of the present invention are possible in the light of the above teachings. It is therefore to be understood that within the scope of the appended claims the invention may be practiced otherwise than as specifically described.

What is claimed is:

1. In a method for determining the presence in the ocean of a submerged object which has a temperature that is different from that of the contiguous seawater, the steps of radiating a directional beam of electromagnetic waves of a preselected frequency towards the ocean surface at an angle such that a portion of said electromagnetic waves is reflected from the ocean surface and a portion enters the ocean, said preselected frequency being chosen such that said portion of electromagnetic waves which enter the ocean is propagated an appreciable distance therein, the electromagnetic waves which are so propagated when they encounter variations in the index of refraction of the seawater caused by the temperature difference between this water and the submerged object being reflected at these subsurface locations with their frequency altered as a consequence of this interaction and, thereafter, emerge from said ocean;

detecting the electromagnetic waves which are reflected from the ocean surface and any electromagnetic waves which emerge from said ocean; and analyzing the frequency of the electromagnetic waves so detected to determine the presence of any electromagnetic waves which have a frequency different from that of said preselected frequency.

2. In a method for determining the presence of an object submerged in the ocean, which object radiates acoustic waves incidental to its normal operation, the steps of directing an incident beam of electromagnetic waves whose frequency is being cylcically varied about a preselected value toward said ocean surface at an angle such that a portion of said electromagnetic waves is reflected from the ocean surface and a portion enters the ocean and is propagated therein for a distance determined by the frequency of said electromagnetic waves, said preselected frequency value being chosen to permit said propagation to occur over a significant distance, the electromagnetic waves, which are so propagated when they encounter an area of the ocean wherein said acoustic waves are present interacting with said acoustic waves and being reflected back out of said ocean; and analyzing the frequencies of all of the electromagnetic reflected waves thereby to determine the presence of a component whose frequency differs from that of the incident beam by an amount related to the frequency of the acoustic waves radiated from said submerged object.

* * * * *